US009399317B2

(12) United States Patent
Sudeji

(10) Patent No.: US 9,399,317 B2
(45) Date of Patent: Jul. 26, 2016

(54) RETARDER MANUFACTURING METHOD USING CROSS-LINKED PARTICLES OF A POLYMER HAVING NEGATIVE INTRINSIC BIREFRINGENCE

(71) Applicant: ZEON CORPORATION, Tokyo (JP)

(72) Inventor: Hironari Sudeji, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 14/382,926

(22) PCT Filed: Feb. 27, 2013

(86) PCT No.: PCT/JP2013/055132
§ 371 (c)(1),
(2) Date: Sep. 4, 2014

(87) PCT Pub. No.: WO2013/133102
PCT Pub. Date: Sep. 12, 2013

(65) Prior Publication Data
US 2015/0021810 A1    Jan. 22, 2015

(30) Foreign Application Priority Data

Mar. 5, 2012   (JP) .................... 2012-048296

(51) Int. Cl.
*B29C 47/00* (2006.01)
*B29C 55/14* (2006.01)
(Continued)

(52) U.S. Cl.
CPC ......... *B29C 47/0057* (2013.01); *B29C 47/0004* (2013.01); *B29C 47/065* (2013.01);
(Continued)

(58) Field of Classification Search
CPC ............... G02B 5/3083; G02B 5/32; G02B 27/28–27/288; G02F 1/13363; G02F 2413/00; G02F 2413/03; G02F 2413/11; G02F 2413/13; G02F 2413/14; B29C 47/04; B29C 47/06; B29C 47/062; B29C 47/065; B29C 47/068; B29C 47/0021; B29C 55/065; B29C 55/085; B29C 55/12; B29C 55/143; B29C 55/146; B29D 11/0073; B29D 11/00788; B29K 2105/24; B29K 2995/05; B29K 2995/0053; B29K 2995/0031; B29K 2995/0032; B29K 2025/04; B29K 2025/06; B29K 2025/08; B29K 2225/04; B29K 2225/06; B29K 2225/08; B29K 2425/04; B29K 2425/06; B29K 2425/08; B29L 2011/00; B29L 2011/0066; B32B 27/00; B32B 27/06
USPC ........ 264/1.24, 1.29, 1.31, 1.34, 1.7, 1.9, 2.7, 264/171.1, 173.11, 173.12, 173.14, 173.15, 264/173.16, 173.19, 174.1; 359/489.01–489.04, 489.07, 489.15
See application file for complete search history.

(56) References Cited

U.S. PATENT DOCUMENTS 5,337,174 A *  8/1994  Wada .................... G02B 5/3083
349/119
2006/0077320 A1   4/2006  Hata et al.
(Continued)

FOREIGN PATENT DOCUMENTS

CN         101509985 A     8/2009
JP         A-2003-161832   6/2003
(Continued)

OTHER PUBLICATIONS

Apr. 2, 2013 International Search Report issued in International Application No. PCT/JP2013/055132.

*Primary Examiner* — Stephone B Allen
*Assistant Examiner* — Ryan Dunning
(74) *Attorney, Agent, or Firm* — Oliff PLC

(57) ABSTRACT

Method for producing a phase difference plate includes step of forming a layered body including resin-layer (a) containing resin-A having a positive intrinsic birefringence, resin-layer (b) contains resin-B having a negative intrinsic birefringence and is provided on a surface of resin-layer (a), and resin-layer (c) contains resin-C having positive intrinsic birefringence and is provided on another surface opposite to the resin-layer (a) of resin-layer (b); a first step of stretching the layered body in one direction at temperature T1 and stretching ratio of 3 times or more; and a second stretching step of, after the first stretching step, stretching the layered body in another direction approximately orthogonal to the stretching direction at a temperature T2 that is lower than temperature T1 to obtain a phase difference plate, wherein resin-C contains polymer X having a positive intrinsic birefringence and cross-linked particles of polymer Y having a negative intrinsic birefringence.

13 Claims, 1 Drawing Sheet

(51) Int. Cl.
*B29C 55/02* (2006.01)
*G02B 5/30* (2006.01)
*B29C 47/06* (2006.01)
*B29K 25/00* (2006.01)
*B29K 69/00* (2006.01)
*B29L 11/00* (2006.01)

(52) U.S. Cl.
CPC ............... *B29C55/023* (2013.01); *B29C 55/14* (2013.01); *G02B 5/30* (2013.01); *G02B 5/3083* (2013.01); *B29K 2025/06* (2013.01); *B29K 2069/00* (2013.01); *B29K 2995/0032* (2013.01); *B29K 2995/0034* (2013.01); *B29L 2011/0066* (2013.01)

(56) References Cited

U.S. PATENT DOCUMENTS

2009/0220758 A1* 9/2009 Hatano ................. B29C 55/023
 428/213
2015/0224727 A1 8/2015 Hatano

FOREIGN PATENT DOCUMENTS

| JP | A-2006-072309 | 3/2006 |
| JP | A-2006-113203 | 4/2006 |
| JP | A-2008-134545 | 6/2008 |
| JP | A-2009-192845 | 8/2009 |
| JP | A-2010-191385 | 9/2010 |
| JP | A-2011-039338 | 2/2011 |
| JP | A-2012-137723 | 7/2012 |

* cited by examiner

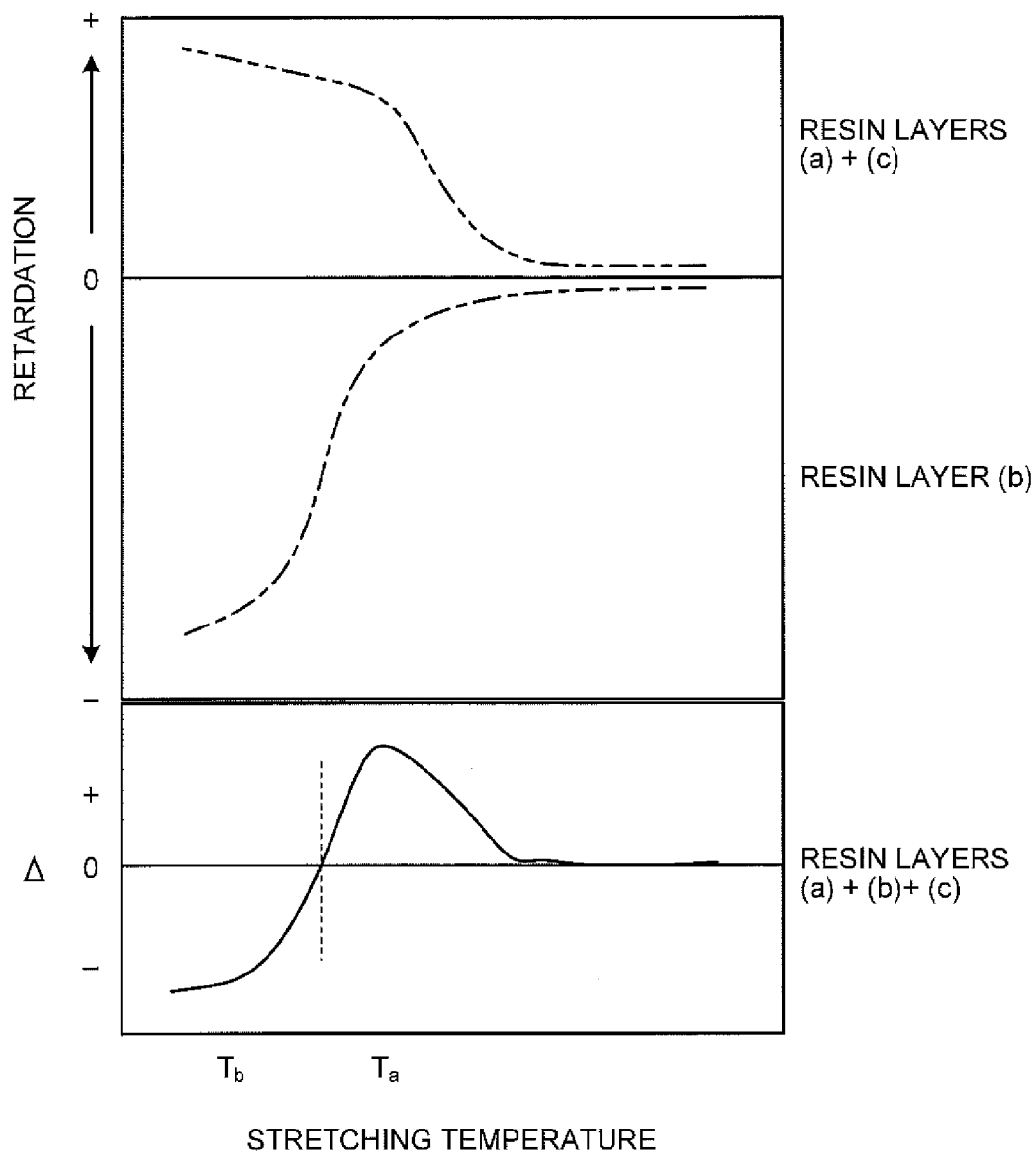

RETARDER MANUFACTURING METHOD USING CROSS-LINKED PARTICLES OF A POLYMER HAVING NEGATIVE INTRINSIC BIREFRINGENCE

FIELD

The present invention relates to a method for producing a phase difference plate.

BACKGROUND

A phase difference plate used for, e.g., optical compensation of a liquid crystal display device is required to have ability to reduce the change in color tone of the display device at different viewing angles. Various techniques therefor have been hitherto developed. For example, Patent Literature 1 discloses a technique in which a phase difference plate is produced by stretching a layered body that includes a resin layer (a) containing a resin A having a positive intrinsic birefringence, a resin layer (b) containing a resin B having a negative intrinsic birefringence, and a resin layer (c) containing a resin C having a positive intrinsic birefringence, in this order.

CITATION LIST

Patent Literature

Patent Literature 1: Japanese Patent Application Laid-Open No. 2011-39338 A

SUMMARY

Technical Problem

According to the aforementioned method, it is possible to produce, e.g., a three-dimensional phase difference plate. The three-dimensional phase difference plate is a phase difference plate having an NZ coefficient of 0 or more and 1 or less. In order to set the NZ coefficient within this range, it is generally required that each of the resin layers containing a resin having a positive intrinsic birefringence is made thinner than the resin layer containing a resin having a negative intrinsic birefringence. Further, it is also required that one of the two resin layers containing a resin having a positive intrinsic birefringence is made thinner than the other.

Therefore, in the three-dimensional phase difference plate, one of the resin layers containing a resin having a positive intrinsic birefringence usually has a particularly reduced thickness. For example, when a three-dimensional phase difference plate is produced from a polycarbonate resin as a resin having a positive intrinsic birefringence and a polystyrene resin as a resin having a negative intrinsic birefringence, the thickness of the thinner resin layer containing the resin having a positive intrinsic birefringence is usually about 1/20 or less of that of the resin layer containing the resin having a negative intrinsic birefringence.

On the other hand, a phase difference plate is generally required to have a reduced thickness. An example of considerable strategies for producing a thin phase difference plate is reduction of the thickness of a layered body for production of the phase difference plate. However, reduction of the thickness of the layered body leads to reduction of the thickness of each resin layer contained in the layered body. Thus, in a layered plate for production of a three-dimensional phase difference plate, it is required that the thickness of the thinner resin layer containing a resin having a positive intrinsic birefringence is further reduced as compared with prior-art ones. However, in recent years, reduction in the layer thickness has already proceeded to a high level. Therefore, an attempt to further reduce the thickness of the resin layer containing a resin having a positive intrinsic birefringence results in hindrance to stable production. For example, when the attempt to reduce the layer thickness is proceeded to still higher level, the thinner resin layer containing a resin having a positive intrinsic birefringence may be damaged during stretching. In addition, the thickness of the thinner resin layer containing a resin having a positive intrinsic birefringence in the layered body may be made non-uniform. Consequently, the thickness of the thinner resin layer containing a resin having a positive intrinsic birefringence in the phase difference plate may also be made non-uniform.

Then the point to be considered is reduction of the thickness of the resin layer containing a resin having a positive intrinsic birefringence while keeping the uniformity of the thickness. Given that, in the layered body to be produced, the thickness of the resin layer containing a resin having a positive intrinsic birefringence and the thickness of the resin layer containing a resin having a negative intrinsic birefringence are at the same level, it would be possible to produce such a layered body by, e.g., an extrusion method with high extrusion rate. However, in the layered body for producing a three-dimensional phase difference plate, the thickness of the resin layer containing a resin having a positive intrinsic birefringence and the thickness of the resin layer containing a resin having a negative intrinsic birefringence are significantly different from each other as described above. Accordingly, in the prior-art technique, it is difficult to realize further reduction of the thickness.

Alternatively, if the production efficiency of a phase difference plate is not considered, it would be possible to, e.g., carefully perform a production operation by a well-experienced expert, to produce a thin phase difference plate having resin layers each of which has a uniform thickness. However, from the viewpoint of industrial production, it is difficult to stably and effectively produce a product with a constant quality.

The present invention is made in view of the aforementioned problems. It is an object of the present invention to provide a method for producing a phase difference plate that is capable of stably producing a thinner phase difference plate than prior-art ones.

Solution to Problem

The present inventor has performed intensive studies to solve the problems. As a result, the present inventor has found out that when a resin layer containing a resin having a positive intrinsic birefringence contains cross-linked particles of a polymer having a negative intrinsic birefringence, a layered body before stretching can be made thick and the stretching ratio can be increased, and therefore the thickness of a phase difference plate having desired optical characteristics can be reduced. Thus, the present invention has been completed.

Accordingly, the present invention provides the following:

[1] A method for producing a phase difference plate, comprising:

a step of forming a layered body including a resin layer (a) containing a resin A having a positive intrinsic birefringence, a resin layer (b) that contains a resin B having a negative intrinsic birefringence and is provided on a surface of the resin layer (a), and a resin layer (c) that contains a resin C having a positive intrinsic birefringence and is provided on another surface opposite to the resin layer (a) of the resin layer (b);

a first stretching step of stretching the layered body in one direction at a temperature T1 and a stretching ratio of 3 times or more; and a second stretching step of, after the first stretching step, stretching the layered body in another direction that is approximately orthogonal to the stretching direction at a temperature T2 that is lower than the temperature T1 to obtain a phase difference plate, wherein the resin C contains a polymer X having a positive intrinsic birefringence and cross-linked particles of a polymer Y having a negative intrinsic birefringence.

[2] The production method according to [1], wherein the resin layer (c) has a thickness thinner than a thickness of the resin layer (a).

[3] The production method according to [1] or [2], wherein the phase difference plate has an NZ coefficient of 0 or more and 1 or less.

[4] The production method according to any one of [1] to [3], wherein the polymer Y is a polystyrene-based polymer.

[5] The production method according to any one of [1] to [4], wherein the resin A has a glass transition temperature $Tg_A$ higher than a glass transition temperature $Tg_B$ of the resin B.

[6] The production method according to any one of [1] to [5], wherein the layered body is formed by a co-extrusion method.

[7] The production method according to any one of [1] to [6], wherein a phase of linearly polarized light that is incident perpendicularly on a film plane and has a plane of vibration of its electric vector lying in an XZ plane relative to linearly polarized light that is incident perpendicularly on the film plane and has a plane of vibration of its electric vector lying in a YZ plane is delayed when the layered body is uniaxially stretched at a temperature T1 in an X-axial direction, and advanced when the layered body is uniaxially stretched at a temperature T2 different from the temperature T1 in the X-axial direction, wherein, in the layered body, X axis is a uniaxial stretching direction, Y axis is a direction orthogonal to the uniaxial stretching direction in the film plane, and Z axis is a film thickness direction.

Advantageous Effects of Invention

According to the method for producing a phase difference plate of the present invention, a thinner phase difference plate than prior-art ones can be stably produced.

BRIEF DESCRIPTION OF DRAWINGS

FIG. 1 is a graph illustrating an example of temperature dependence of retardation A when resin layers (a) and (c) and a resin layer (b) are stretched, and an example of temperature dependence of retardation Δ when a pre-stretch layered body is stretched, assuming that resins A and C constituting the resin layers (a) and (c) have high glass transition temperatures $Tg_A$ and $Tg_C$, and a resin B constituting the resin layer (b) has a low glass transition temperature $Tg_B$.

DESCRIPTION OF EMBODIMENTS

The present invention will be described in detail hereinbelow with reference to examples and embodiments, but the present invention is not limited to the following examples and embodiments and may be implemented with any optional modifications without departing from the scope of the claims of the present invention and equivalents thereof.

The reference symbol "A" of the resin A, the reference symbol "B" of the resin B, the reference symbol "C" of the resin C, the reference symbol "(a)" of the resin layer (a), the reference symbol "(b)" of the resin layer (b), and the reference symbol "(c)" of the resin layer (c) as described later are reference symbols intended to distinguish elements labeled with the reference symbols from other elements, and do not have meaning other than to distinguish the elements.

A positive intrinsic birefringence means that the refractive index in a stretching direction is larger than the refractive index in a direction orthogonal to the stretching direction, and a negative intrinsic birefringence means that the refractive index in the stretching direction is smaller than the refractive index in the direction orthogonal to the stretching direction. The value of the intrinsic birefringence may also be calculated from a permittivity distribution.

Unless otherwise specified, an in-plane retardation (in-plane phase difference) of a film or a layer is a value represented by (nx−ny)×d. Unless otherwise specified, a retardation in a thickness direction (phase difference in a thickness direction) of a film or a layer is a value represented by {|nx+ny|/2−nz}×d. Herein, nx represents the refractive index in a stretching direction of the film or the layer that is a direction orthogonal to the thickness direction of the film or the layer (in-plane direction). ny represents the refractive index in an in-plane direction that is orthogonal to the direction of nx. nz represents the refractive index in the thickness direction. d represents the thickness of the film or the layer. When stretching is carried out a plurality of times, the stretching direction for the first stretching is defined as the direction of nx, and this direction is still regarded as the direction of nx in the second and later stretching. The retardation may be measured with a commercially available phase difference measurement apparatus (for example, "WPA-micro" manufactured by Photonic Lattice, Inc.) or by a Senarmont method. Unless otherwise specified, the measurement wavelength is 590 nm.

Unless otherwise specified, the NZ coefficient of the film or the layer is a value represented by (Nx−Nz)/(Nx−Ny). Herein, Nx represents the refractive index in a direction that gives the highest refractive index and is the direction orthogonal to the thickness direction of the film or the layer (in-plane direction). Ny represents the refractive index in an in-plane direction orthogonal to the direction of Nx. Nz represents the refractive index in the thickness direction. d represents the thickness of the film or the layer. Unless otherwise specified, the measurement wavelength is 590 nm.

The expression "long-length" means a shape whose length is at least 5 times or more longer than a width, and preferably 10 times or more longer than the width, and specifically means a shape having a length capable of being wound up into a roll shape for storage or transportation.

Further, the expression "approximately orthogonal" means that the angle formed is usually 85° or larger and preferably 89° or larger, and usually 95° or smaller and preferably 91° or smaller.

The expression "approximately parallel" includes cases wherein the angle formed is 0° (i.e., precisely parallel) and, in addition, the cases wherein the angle is within a range of ±5°, and preferably within a range of ±1°.

A "polarizing plate" and a "phase difference plate" include not only a rigid member, but also a flexible member such as a resin-made film.

[1. Summary]

The method for producing a phase difference plate of the present invention includes: a step of forming a layered body including a resin layer (a) containing a resin A having a positive intrinsic birefringence, a resin layer (b) that contains a resin B having a negative intrinsic birefringence and is provided on a surface of the resin layer (a), and a resin layer (c) that contains a resin C having a positive intrinsic birefringence and is provided on another surface opposite to the resin layer (a) of the resin layer (b) (this layered body will be referred to hereinbelow as "pre-stretch layered body") (layered body forming step); a first stretching step of stretching the pre-stretch layered body in one direction at a temperature T1 and a stretching ratio of 3 times or more; and a second stretching step of, after the first stretching step, stretching the pre-stretch layered body in another direction that is approximately orthogonal to the stretching direction at a temperature T2 that is lower than the temperature T1 to obtain a phase difference plate. Herein, the resin C contains a polymer X having a positive intrinsic birefringence and cross-linked particles of a polymer Y having a negative intrinsic birefringence. According to this production method, a thinner phase difference plate than prior-art ones can be stably produced. The reason how such an advantage is obtained by the production method of the present invention is not surely known. However, on the basis of studies by the present inventors, the reason therefor is deduced as follows.

(i) In the method for producing a phase difference plate of the present invention, the pre-stretch layered body that includes the resin layer (a) containing the resin A, the resin layer (b) containing the resin B, and the resin layer (c) containing the resin C in this order is stretched to obtain a phase difference plate. Herein, the resin C in the resin layer (c) contains the polymer X and the cross-linked particles of the polymer Y. Since the particles are cross-linked particles, even when the resin layer (c) is stretched, high refractive index anisotropy is not expressed in the cross-linked particles of the polymer Y. Therefore, even when the resin layer (c) is made thicker by the amount of cross-linked particles of the polymer Y, the retardation expressed in the resin layer (c) after stretching does not excessively increase, and the retardation of the resulting phase difference plate can be appropriately controlled. Accordingly, in the pre-stretch layered body, the resin layer (c) can be made thick in accordance with the amount of cross-linked particles of the polymer Y. An increase in the thickness of the resin layer (c) leads to an enhancement of the strength of the resin layer (c), and thus the stretching ratio can be increased. Since the stretching ratio can thus be increased, the thickness of the phase difference plate can be reduced.

(ii) The intrinsic birefringence of the resin C is positive. Therefore, the resin layer (c) in the resulting phase difference plate expresses a retardation on the basis of the positive intrinsic birefringence of the resin C. Aiming at expressing such retardation on the basis of the positive intrinsic birefringence, the resin C contains the polymer X having a positive intrinsic birefringence.

However, the resin C also contains the cross-linked particles of the polymer Y as described above. The intrinsic birefringence of the polymer Y is negative. Therefore, when the resin layer (c) is stretched, the refractive index anisotropy, which is lower than that of an uncross-linked polymer Y, is expressed in the cross-linked particles of the polymer Y. Therefore, when the resin layer (c) is stretched, the refractive index anisotropy expressed in the polymer X is attenuated by the effect of the refractive index anisotropy expressed in the cross-linked particles of the polymer Y.

Therefore, even when the resin layer (c) is thickened aiming at compensating the attenuation caused by the effect of cross-linked particles of the polymer Y with the effect of refractive index anisotropy expressed by the polymer X, the retardation expressed in the resin layer (c) after stretching does not excessively increase. As a result, the retardation of the resulting phase difference plate can be appropriately controlled. Accordingly, in the pre-stretch layered body, the resin layer (c) can be made thick in accordance with the amount of cross-linked particles of the polymer Y. An increase in the thickness of the resin layer (c) leads to an enhancement of the strength of the resin layer (c), and thus the stretching ratio can be increased. Since the stretching ratio can thus be increased, the thickness of the phase difference plate can be reduced.

(iii) In the resin layer (c) of the pre-stretch layered body, the dispersion state of cross-linked particles of the polymer Y is usually uniform. However, when the pre-stretch layered body is stretched, the dispersion state of cross-linked particles is coarse in the stretching direction and dense in the direction orthogonal to the stretching direction. Therefore, in the resin layer (c) after stretching, distribution birefringence (for example, see Japanese Patent Application Laid-Open No. 2000-313816 A) is generated. Also by the distribution birefringence, the refractive index anisotropy of the resin layer (c) is attenuated. Therefore, even when the resin layer (c) is made thicker for compensating the attenuation of refractive index anisotropy caused by the distribution birefringence, the retardation expressed in the resin layer (c) after stretching does not excessively increase. As a result, the retardation of the resulting phase difference plate can be appropriately controlled. Accordingly, in the pre-stretch layered body, the resin layer (c) can be made thick by virtue of the effect of the distribution birefringence. An increase in the thickness of the resin layer (c) leads to an enhancement of the strength of the resin layer (c), and thus the stretching ratio can be increased. Since the stretching ratio can thus be increased, the thickness of the phase difference plate can be reduced.

(iv) The resin B having a negative intrinsic birefringence in the resin layer (b) generally has low strength. However, in the pre-stretch layered body according to the present invention, the resin layer (b) is protected with the resin layers (a) and (c). Therefore, even when the stretching ratio is increased, the resin layer (b) is unlikely to be damaged. Therefore, the stretching ratio can be increased. As a result, the thickness of the phase difference plate can be reduced.

(v) Since the thickness of the resin layer (c) can be increased, damage caused by stretching the resin layer (c) can be suppressed. Further, the resin layer (c) in the pre-stretch layered body may be made thicker as compared with prior-art ones. Therefore, non-uniformity of the layer thickness caused by excessive reduction of the thickness of the layer (c) can thereby be avoided. Accordingly, the resin layer (c) in the phase difference plate can be prevented from becoming non-uniform and damaging. According to the method for producing a phase difference plate of the present invention, a thin phase difference plate can thus be stably produced.

[2. Layered Body Forming Step]

In the layered body forming step, the pre-stretch layered body is formed. The pre-stretch layered body is preferably produced by a co-extrusion method or a co-casting method using the resin A, the resin B, and the resin C. In particular, the co-extrusion method is preferable.

[2.1. Resin A]

The resin A is a resin having a positive intrinsic birefringence. As the resin A, a thermoplastic resin having a positive intrinsic birefringence is usually used.

Since the intrinsic birefringence of the resin A is positive, the resin A usually contains a polymer having a positive intrinsic birefringence. Examples of the polymer may include an olefin polymer such as polyethylene and polypropylene; a polyester polymer such as polyethylene terephthalate and polybutylene terephthalate; a polyarylene sulfide polymer such as a polyphenylene sulfide; a polyvinyl alcohol polymer, a polycarbonate polymer, a polyarylate polymer, a cellulose ester polymer, a polyether sulfone polymer, a polysulfone polymer, a polyallylsulfone polymer, a polyvinyl chloride polymer, a norbornene polymer, and a rod-shaped liquid crystal polymer. As the polymer, one type thereof may be used alone, or two or more types thereof may be used in combination at any ratio. Further, the polymer may be a homopolymer or a copolymer. Among them, the polycarbonate polymer is preferable from the viewpoints of retardation expression, stretching properties at low temperature, and adhesion of the resin layer (a) to layers other than the resin layer (a).

As the polycarbonate polymer, any polymer having a repeating unit with a carbonate bond (—O—C(=O)—O—) may be used. Examples of the polycarbonate polymer may include bisphenol A polycarbonate, branched bisphenol A polycarbonate, and O,O,O',O'-tetramethyl bisphenol A polycarbonate.

The resin A may contain an additive. Examples of the additive may include an anti-friction agent; a lamellar crystal compound; inorganic fine particles; a stabilizer such as an antioxidant, a thermal stabilizer, a photostabilizer, a weathering stabilizer, an ultraviolet absorber, and a near infrared absorber; a plasticizer; a coloring agent such as a dye and a pigment; and an antistatic agent. Among them, the anti-friction agent and the ultraviolet absorber are preferable since flexibility and weather resistance can thereby be improved. As the additive, one type thereof may be used alone, or two or more types thereof may be used in combination at any ratio.

Examples of the ultraviolet absorber may include an oxybenzophenone-based compound, a benzotriazole-based compound, a salicylate ester-based compound, a benzophenone-based ultraviolet absorber, a benzotriazole-based ultraviolet absorber, an acrylonitrile-based ultraviolet absorber, a triazine-based compound, a nickel complex salt compound, and an inorganic powder. Suitable specific examples of the ultraviolet absorber may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly suitable examples thereof may include 2,2'-methylenebis(4-(1,1,3,3-tetramethylbutyl)-6-(2H-benzotriazole-2-yl)phenol).

The amount of the additive may be appropriately determined as long as it does not significantly impair the effects of the present invention. For example, the amount thereof may fall within such a range that in a pre-stretch layered body having a thickness of 1 mm, the total light transmittance can be kept to 80% or more.

The weight average molecular weight of the resin A is preferably adjusted within such a range that a melt extrusion method or a solution casting method using the resin A can be performed.

The glass transition temperature $Tg_A$ of the resin A is usually 80° C. or higher, preferably 90° C. or higher, more preferably 100° C. or higher, still more preferably 110° C. or higher, and particularly preferably 120° C. or higher. When the resin A has such high glass transition temperature $Tg_A$, the orientational relaxation thereof can be reduced. The upper limit of the glass transition temperature $Tg_A$ is not particularly limited, and is usually 200° C. or lower.

The fracture elongation of the resin A at the glass transition temperature $Tg_B$ of the resin B, which will be described below, is preferably 50% or more, and more preferably 80% or more. When the fracture elongation falls within this range, the phase difference plate can be stably produced by stretching. The fracture elongation is determined using a test piece of type 1B in accordance with JIS K7127 at a tensile rate of 100 ram/min. The upper limit of the fracture elongation of the resin A is not particularly limited, and is usually 200% or less.

[2.2. Resin B]

The resin B is a resin having a negative intrinsic birefringence. As the resin B, a thermoplastic resin having a negative intrinsic birefringence is usually used.

Since the intrinsic birefringence of the resin B is negative, the resin B usually contains a polymer having a negative intrinsic birefringence. Examples of the polymer may include a polystyrene-based polymer including a homopolymer of styrene or a styrene derivative or a copolymer thereof with an additional monomer; a polyacrylonitrile polymer, a polymethyl methacrylate polymer, and multi-component copolymers thereof. Preferable example of the additional monomer contained in the polystyrene-based polymer may include acrylonitrile, maleic anhydride, methyl methacrylate, and butadiene. As the polymer, one type thereof may be used alone, or two or more types thereof may be used in combination at any ratio. Among them, the polystyrene-based polymer is preferable from the viewpoint of high retardation expression, and a copolymer of styrene or a styrene derivative with maleic anhydride is particularly preferable from the viewpoint of high thermal resistance. In this case, the amount of a structural unit (maleic anhydride unit) formed by polymerization of maleic anhydride is preferably 5 parts by weight or more, more preferably 10 parts by weight or more, particularly preferably 15 parts by weight or more, and preferably 30 parts by weight or less, more preferably 28 parts by weight or less, and particularly preferably 26 parts by weight or less, with respect to 100 parts by weight of styrenic polymer.

The resin B may contain an additive. Examples thereof may include the same additives as those that may be contained in the resin A. As the additive, one type thereof may be used alone, or two or more types thereof may be used in combination at any ratio.

The amount of the additive may be appropriately determined as long as it does not significantly impair the effects of the present invention. For example, the amount thereof may fall within such a range that in the pre-stretch layered body having a thickness of 1 mm, the total light transmittance can be kept to 80% or more.

The weight average molecular weight of the resin B is preferably adjusted within such a range that a melt extrusion method or a solution casting method using the resin B can be performed.

The glass transition temperature $Tg_B$ of the resin B is usually 80° C. or higher, preferably 90° C. or higher, more preferably 100° C. or higher, still more preferably 110° C. or higher, and particularly preferably 120° C. or higher. When the resin B has such high glass transition temperature $Tg_B$, the orientational relaxation thereof can be reduced. The upper limit of the glass transition temperature $Tg_B$ is not particularly limited, and is usually 200° C. or lower.

The fracture elongation of the resin B at the glass transition temperature $Tg_A$ of the resin A is preferably 50% or more, and more preferably 80% or more. When the fracture elongation falls within this range, the phase difference plate of the present invention can be stably produced by stretching. The upper limit of the fracture elongation of the resin B is not particularly limited, and is usually 200% or less.

The absolute value of a difference between the glass transition temperature $Tg_A$ of the resin A and the glass transition temperature $Tg_B$ of the resin B is preferably more than 5° C. and more preferably 8° C. or more, and preferably 40° C. or less and more preferably 20° C. or less. When the absolute value of the difference between the glass transition temperatures is more than the lower limit of this range, the temperature dependency of retardation expression can be increased. In contrast, when the absolute value of the difference between the glass transition temperatures is equal to or less than the upper limit of this range, the resin having a high glass transition temperature can be easily stretched and the flatness of the phase difference plate can be enhanced. The glass transition temperature $Tg_A$ is preferably higher than the glass transition temperature $Tg_B$. Therefore, it is usually preferable that the resin A and the resin B satisfy the relationship of $Tg_A > Tg_B + 5°$ C.

[2.3. Resin C]

The resin C is a resin having a positive intrinsic birefringence. As the resin C, a thermoplastic resin having a positive intrinsic birefringence is usually used. Herein, the resin C contains a polymer X having a positive intrinsic birefringence and cross-linked particles of a polymer Y having a negative intrinsic birefringence.

Examples of the polymer X may include polymers having a positive intrinsic birefringence that are exemplified in the description of the resin A. Among them, it is preferable that the polymer A is a polycarbonate polymer from the viewpoints of retardation expression, stretching properties at low temperature, and adhesion of the resin layer (c) to layers other than the resin layer (c). As the polymer X, one type thereof may be used alone, or two or more types thereof may be used in combination at any ratio.

Examples of the polymer Y may include polymers having a negative intrinsic birefringence that are exemplified in the description of the resin B. Among them, it is preferable that the polymer Y is a polystyrene-based polymer from the viewpoint of high retardation expression. As the polymer Y, one type thereof may be used alone, or two or more types thereof may be used in combination at any ratio.

The cross-linked particles of the polymer Y are particles formed from a cross-linked product of the polymer Y. For example, such cross-linked particles of the polymer Y may be produced by suspension polymerization of styrene in the presence of divinylbenzene.

The amount of the cross-linked particles of the polymer Y is usually 0.01 parts by weight or more, preferably 0.1 parts by weight or more, and more preferably 0.3 part by weight or more, and usually 30 parts by weight or less, preferably 20 parts by weight or less, and more preferably 10 part by weight or less, with respect to 100 parts by weight of the polymer X. When the amount of the cross-linked particles of the polymer Y is equal to or more than the lower limit of this range, the retardation expressed in the resin layer (c) can be suppressed. When it is equal to or less than the upper limit, haze can be reduced.

The volume average particle diameter of the polymer Y is usually 0.1 μm or more, preferably 0.2 μm or more, and more preferably 0.3 μm or more, and usually 1.5 μm or less, preferably 1.2 μm or less, and more preferably 0.9 μm or less. When the particle diameter of the cross-linked particles of the polymer Y is equal to or more than the lower limit of this range, secondary aggregation can be suppressed. When it is equal to or less than the upper limit, capture of the particles on a polymer filter during extrusion can be suppressed.

The resin C may contain an additive. Examples of the additive may include the same additives that may be contained in the resin A. As the additive, one type thereof may be used alone, or two or more types thereof may be used in combination at any ratio.

The amount of the additive may be appropriately determined as long as it does not significantly impair the effects of the present invention. For example, the amount thereof may fall within such a range that in the pre-stretch layered body having a thickness of 1 mm, the total light transmittance can be kept to 80% or more.

The weight average molecular weight of the resin C is preferably adjusted within such a range that a melt extrusion method or a solution casting method using the resin C can be performed.

The glass transition temperature $Tg_C$ of the resin C may be set within the same range as in the glass transition temperature $Tg_A$ of the resin A for the same reason as that described in the section of the resin A.

The fracture elongation of the resin C at the glass transition temperature $Tg_B$ of the resin B may be set within the same range as that for the fracture elongation of the resin A at the glass transition temperature $Tg_B$ of the resin B for the same reason as that described in the section of the resin A.

The absolute value of a difference between the glass transition temperature $Tg_C$ of the resin C and the glass transition temperature $Tg_B$ of the resin B may set within the same range as that for the absolute value of the difference between the glass transition temperature $Tg_A$ of the resin A and the glass transition temperature $Tg_B$ of the resin B for the same reason as that described in the section of the resin B.

Usually, the cross-linked particles of the polymer Y do not largely affect the glass transition temperature $Tg_C$ of the resin C. This is because the polymer Y forming the cross-linked particles is cross-linked, and therefore the cross-linked particles have a property of maintaining the shape of the particles even at higher temperature. This point contrasts with, e.g., an idea that in a resin in which an uncrosslinked polymer Y is mixed in a polymer X, the molecular weight and amount of the polymer Y would affect the glass transition temperature of the resin. Therefore, for adjusting the glass transition temperature $Tg_C$ of the resin C, it is preferable to perform control on the polymer X.

It is preferable that the resin C for use is the same resin as the resin A except that the cross-linked particles of the polymer Y are contained. Therefore, it is preferable that the polymer X and the additive are the same as the polymer and the additive contained in the resin A. Also, it is preferable that the amounts of these are the same as those in the resin A. Consequently, bending and warping of the pre-stretch layered body or the phase difference plate can be suppressed.

[2.4. Method for Forming Pre-Stretch Layered Body]

It is preferable that the pre-stretch layered body is formed by a co-extrusion method. The co-extrusion method is a method in which a plurality of resins in a melted state are extruded for perform molding. The co-extrusion method is excellent in terms of production efficiency and preventing volatile components such as a solvent from remaining in the pre-stretch layered body.

Further, the polymer Y is cross-linked. Therefore, even when the resin C is in the melted state, the cross-linked particles are capable of being dispersed in the resin C while the shape of the particles is maintained. At this time, the cross-linked particles can be dispersed with good dispersibility, and therefore haze in the resin C is unlikely to be caused.

On the other hand, given that the co-extrusion method is performed using a resin containing a polymer X and an uncrosslinked polymer Y, the polymer X and the polymer Y would be phase-separated to produce an aggregate mass of the polymer X or the polymer Y, and the resin C may become cloudy. Therefore, use of the cross-linked particles of the polymer Y in the co-extrusion method is meaningful for preventing haze and increasing the transparency.

Examples of the co-extrusion method may include a co-extrusion T-die method, a co-extrusion inflation method, and a co-extrusion lamination method. Among them, the co-extrusion T-die method is preferable. The co-extrusion T-die method may be of a feed block procedure or of a multi-manifold procedure. The multi-manifold procedure is particularly preferable since the thickness variation of the resin layer (a) and the resin layer (c) can be reduced.

When the co-extrusion T-die method is employed, the melting temperature of a resin in an extruder provided with a T-die is a temperature higher than the glass transition temperature (Tg) of each resin by 80° C. or more, and preferably by 100° C. or more, and preferably by 180° C. or less, and more preferably by 150° C. or less. When the melting temperature of the resin by the extruder is equal to or higher than the lower limit of this range, the fluidity of the resin can be sufficiently increased. When it is equal to or lower than the upper limit, deterioration of the resin can be prevented.

Usually, a sheet-shaped melted resin that has been extruded from an opening portion of the die is brought into close contact with a cooling drum. The method for bringing the melted resin into close contact with the cooling drum is not particularly limited, and examples thereof may include an air knife procedure, a vacuum box procedure, and an electrostatic adhesion procedure.

The number of the cooling drum is not particularly limited, and is usually two or more. Examples of arrangement of the cooling drum may include, but are not particularly limited to, a straight line form, a Z form, and an L form. Further, the method for passing the melted resin that has been extruded from the opening portion of the die to the cooling drum is not particularly limited.

The degree of close contact of the extruded sheet-shaped resin with the cooling drum changes depending on the temperature of the cooling drum. When the temperature of the cooling drum is increased, high level of close contact can be achieved. However, when the temperature is excessively increased, the sheet-shaped resin may not be separated from the cooling drum and may be wound around the drum. Therefore, the temperature of the cooling drum is preferably (Tg+30)° C. or lower, and more preferably within a range of (Tg−5)° C. to (Tg−45)° C., in which Tg represents the glass transition temperature of the resin in a layer that is in contact with the drum among the resins A, B, and C extruded from the die. Thus, problems such as slipping and flaw can be prevented.

It is preferable that the content of a residual solvent in the pre-stretch layered body is reduced.

Examples of means for reducing the content of a residual solvent may include (1) means of reducing the amount of the residual solvent in the raw material resins; and (2) means of pre-drying the resins before molding of the pre-stretch layered body. The pre-drying is performed by, e.g., preparing the resin in a form of pellets and then treating the pellets with a hot air dryer. The drying temperature is preferably 100° C. or higher, and the drying time is preferably 2 hours or more. By the pre-drying, the residual solvent in the pre-stretch layered body can be reduced, and the extruded sheet-shaped resin can be prevented from foaming.

[2.5. Pre-Stretch Layered Body]

The pre-stretch layered body includes the resin layer (a) containing the resin A, the resin layer (b) containing the resin B, and the resin layer (c) containing the resin C in this order. The resin layer (a) is preferably a layer consisting of the resin A, the resin layer (b) is preferably a layer consisting of the resin B, and the resin layer (c) is preferably a layer consisting of the resin C. Usually, the resin layer (a) and the resin layer (b) are in direct contact with each other, and the resin layer (b) and the resin layer (c) are also in direct contact with each other.

The thicknesses of the resin layer (a), the resin layer (b), and the resin layer (c) may be set in accordance with the retardation of the phase difference plate to be produced. It is preferable that the thickness of the resin layer (c) is made thinner than that of the resin layer (a). That is, it is preferable that a particularly thin resin layer (c) contains the cross-linked particles of the polymer Y. When the particularly thin resin layer (c) contains the cross-linked particles and the thickness of the resin layer (c) can thereby be increased, deterioration in uniformity of the thickness of the resin layer (c) in the pre-stretch layered body can be avoided. In addition, such inclusion of the particles is preferable also because damage on the resin layer (c) can thereby be avoided even when the pre-stretch layered body is stretched with high stretching ratio.

For example, when the resin A and the resin C are the same resin except for the cross-linked particles of the polymer Y, the ratio of the thickness of the resin layer (a) to the thickness of the resin layer (c) "(the thickness of the resin layer (a))/(the thickness of the resin layer (c))" is preferably 1.5/1 or more. From the viewpoint of maintaining the accuracy of the thickness of the resin layer (c), "(the thickness of the resin layer (a))/(the thickness of the resin layer (c))" is preferably 10/1 or less.

When a three-dimensional phase difference plate is produced as the phase difference plate, the thickness of the resin layer (b) is usually thicker than the sum of the thickness of the resin layer (a) and the thickness of the resin layer (c). For example, when a three-dimensional phase difference plate is produced using a resin containing a polycarbonate polymer as the resin A and the resin C and a resin containing a polystyrene-based polymer as the resin B, the ratio of the total thickness of the resin layer (a) and the resin layer (c) to the total thickness of the resin layer (b) ((the total thickness of the resin layer (a) the total thickness of the resin layer (c))/the total thickness of the resin layer (b)) is usually 1/15 or more and preferably 1/10 or more, and usually 1/4 or less. Thereby temperature dependency of retardation expression can be increased.

The total thickness of the pre-stretch layered body is preferably 10 μm or more, more preferably 20 μm or more, and particularly preferably 30 μm or more, and preferably 500 μm or less, more preferably 300 μm or less, and particularly preferably 250 μm or less. When the total thickness of the pre-stretch layered body is equal to or more than the lower limit of the range, the retardation can be sufficiently expressed, and the mechanical strength can be enhanced. When it is equal to or less than the upper limit, the phase difference plate has sufficient flexibility, and the handling property can be enhanced.

The pre-stretch layered body has a property that stretching of the pre-stretch layered body at different temperatures T1 and T2 in different directions that are approximately orthogonal to each other results in generation of a retardation in each of the resin layer (a), the resin layer (b), and the resin layer (c) depending on the respective temperatures T1 and T2 and the stretching direction. When a three-dimensional phase difference plate is produced by the method for producing a phase difference plate of the present invention, the production of the phase difference plate is performed taking advantage of this property. In this case, the retardation generated in the resin layer (a), the retardation generated in the resin layer (b), and the retardation generated in the resin layer (c) are combined. As a result, the NZ coefficient of the phase difference plate can be adjusted to a value of 0 or more and 1 or less.

The degree of retardation that is generated by stretching in the resin layer (a), the resin layer (b), and the resin layer (c) is determined depending on the thickness of the pre-stretch layered body, the stretching temperature, and the stretching ratio. Therefore, it is preferable that the specific structure of the pre-stretch layered body is determined in accordance with optical functions to be expressed such as a polarizing plate compensation function.

In particular, it is preferable that the pre-stretch layered body satisfies a requirement in which a phase of linearly polarized light that is incident perpendicularly on a film plane and has a plane of vibration of its electric vector lying in an XZ plane (appropriately referred to hereinbelow as "XZ polarized light") relative to linearly polarized light that is incident perpendicularly on the film plane and has a plane of vibration of its electric vector lying in a YZ plane (appropriately referred to hereinbelow as "YZ polarized light") is delayed when the pre-stretch layered body is uniaxially stretched at the temperature T1 in an X-axis direction, and advanced when the pre-stretch layered body is uniaxially stretched at the temperature T2 different from the temperature T1 in the X-axis direction, wherein an X axis is a stretching direction of a certain direction (i.e., uniaxial stretching direction), a Y axis is a direction orthogonal to the uniaxial stretching direction in the film plane, and a Z axis is a thickness direction of the film (this requirement will be referred to hereinbelow as a "requirement P").

The requirement P should be satisfied when at least one of a variety of in-plane directions in the pre-stretch layered body is taken as the X axis. The pre-stretch layered body is usually an isotropic raw material film (i.e., without anisotropy). Therefore, when the requirement P is satisfied with one in-plane direction taken as the X axis, the requirement P can be satisfied with any other direction taken as the X axis.

In a film in which a slow axis appears along the X axis by uniaxial stretching, the phase of the XZ polarized light relative to the YZ polarized light is delayed. On the other hand, in a film in which a fast axis appears along the X axis by uniaxial stretching, the phase of the XZ polarized light relative to the YZ polarized light is advanced.

When the requirement P is thus satisfied, the pre-stretch layered body is a film in which appearance of the slow axis or the fast axis depends on the stretching temperature. Such temperature dependence of retardation expression may be controlled, e.g., by adjusting the photoelastic coefficients of the resin A, the resin B, and the resin C, and relationships such as the ratio of thickness of each layer.

The in-plane retardation is a value determined by multiplying a thickness d by a difference between a refractive index nx in the X-axis direction that is the stretching direction and a refractive index ny in the Y-axis direction that is a direction orthogonal to the stretching direction (=nx−ny). The retardation of the layered body in which the resin layer (a), the resin layer (b), and the resin layer (c) are layered is the combination of the retardation of the resin layer (a), the retardation of the resin layer (b), and the retardation of the resin layer (c). Therefore, in order to realize the reversed relationship of the positivity/negativity of the expressed retardation of the layered body including the resin layer (a), the resin layer (b), and the resin layer (c) by stretching at a high temperature T1 and the positivity/negativity of the expressed retardation by stretching at a low temperature T2, it is preferable to control the thicknesses of the resin layer (a), the resin layer (b), and the resin layer (c) so that (i) by stretching at the low temperature T2, the resin having a higher glass transition temperature expresses smaller absolute value of retardation than the absolute value of retardation that the resin having a lower glass transition temperature expresses, and (ii) by stretching at the high temperature T1, the resin having a lower glass transition temperature expresses smaller absolute value of retardation than the absolute value of retardation that the resin having a higher glass transition temperature expresses.

Thus, a pre-stretch layered body that satisfies the requirement P (i.e., the requirement in which the phase of the XZ polarized light relative to the YZ polarized light is delayed when the pre-stretch layered body is uniaxially stretched in the X-axis direction at the temperature T1, and is advanced when the pre-stretch layered body is uniaxially stretched in the X-axis direction at the temperature T2) can be obtained by adjusting the following parameters: the difference between the refractive index nx in the X-axis direction and the refractive index ny in the Y-axis direction that are expressed in each of the resin layer (a), the resin layer (b), and the resin layer (c) by stretching in one direction (i.e., uniaxial stretching); the total thickness of the resin layer (a); the total thickness of the resin layer (b); and the total thickness of the resin layer (c).

The retardation expression upon stretching of the pre-stretch layered body that satisfies the requirement P will be specifically described with reference to the drawing. FIG. 1 is a graph illustrating an example of temperature dependence of retardation Δ when the resin layers (a) and (c) and the resin layer (b) are stretched, and an example of temperature dependence of retardation Δ when the pre-stretch layered body is stretched, assuming that the resins A and C constituting the resin layers (a) and (c) have high glass transition temperatures $Tg_A$ and $Tg_C$, and the resin B constituting the resin layer (b) has a low glass transition temperature $Tg_B$. As shown in FIG. 1, in stretching of the pre-stretch layered body at the temperature $T_b$, negative retardation expressed in the resin layer (b) is larger than positive retardation expressed in the resin layers (a) and (c). Therefore, the entire phase difference plate expresses a negative retardation Δ. On the other hand, in stretching at the temperature $T_a$, negative retardation expressed in the resin layer (b) is smaller than positive retardation expressed in the resin layers (a) and (c). Therefore, the entire phase difference plate expresses a positive retardation. Accordingly, by combining such stretching procedures at the different temperatures $T_a$ and $T_b$, the retardations expressed in stretching at the respective temperatures are combined, and a phase difference plate that has desired retardation and thus exerts a desired optical function can be stably realized.

In the pre-stretch layered body, the thickness variation of each of the resin layer (a), the resin layer (b), and the resin layer (c) on the entire surface is preferably 1 μm or less. Employment of such pre-stretch layered body enables reduction in the variation in the color tone of the display device when the phase difference plate is provided to a display device. Further, changes in the color tone after long-term use can be made uniform.

In order to reduce the thickness variation of the layer A, the layer B, and the layer C on the entire surface to 1 μm or less, as described above, the following (1) to (6) may be carried out.

(1) A polymer filter having an opening of 20 μm or smaller is provided in an extruder.
(2) A gear pump is rotated at 5 rpm or faster.
(3) Enclosing means is disposed around a die.
(4) A air gap is set to 200 mm or less.
(5) Edge pinning is performed when the film is casted onto the cooling roll.
(6) A twin screw extruder or a single-screw extruder having a double flight-type screw is used as the extruder.

The thickness of each resin layer may be determined as follows. The total film thickness is measured using a commercially available contact-type thickness meter. Then a portion of which the thickness has been measured is cut, and the cross section thereof is observed with an optical microscope, to determine the ratio of the thickness of each layer. From the ratio, the thickness of each resin layer may be calculated. This operation may be performed at constant intervals in an MD direction of the film (in a flow direction of the film) and in a TD direction of the film (in a width direction of the film) to determine the thickness average and the thickness variation.

The thickness variation is calculated from the following formulae using the maximum value $T_{max}$ and minimum value $T_{min}$ of the measured thickness T on the basis of the arithmetic average value $T_{ave}$ of the values measured in the aforementioned measurement.

$$\text{Thickness variation (μm)} = \text{larger one of } \text{“}T_{ave} - T_{min}\text{”} \text{ and } \text{“}T_{max} - T_{ave}\text{”}$$

The pre-stretch layered body may have an optional layer in addition to the resin layer (a), the resin layer (b), and the resin layer (c) unless the effect of the present invention is significantly impaired. Examples of the optional layer may include an adhesive layer for effecting adhesion of the resin layers to one another, a mat layer for improving the sliding property of the film, a hard-coat layer such as an impact-resistant polymethacrylate resin layer, an anti-reflection layer, and an anti-fouling layer. The optional layer may be provided onto the pre-stretch layered body that has been obtained by co-extrusion. Alternatively, the optional layer may be provided by co-extruding a material for forming the optional layer with the resin A, the resin B, and the resin C upon co-extrusion of the resin A, the resin B, and the resin C.

The pre-stretch layered body preferably has a total light transmittance of 85% or more. This is for obtaining the phase difference plate suitable for use as an optional member. The upper limit thereof is ideally 100%. The light transmittance may be measured using a spectrophotometer (manufactured by JASCO Corporation, ultraviolet visible near-infrared spectrophotometer "V-570") in accordance with JIS K0115.

The haze of the pre-stretch layered body is preferably 5% or less, more preferably 3% or less, and particularly preferably 1% or less. When the haze takes a lower value, the clarity of a display image of a display device in which the phase difference plate to be produced is incorporated can be increased. The lower limit thereof is ideally zero. The haze herein is an average value calculated from measurement at five points using a "turbidimeter NDH-300A" (manufactured by NIPPON DENSHOKU INDUSTRIES CO., LTD.) in accordance with JIS K7361-1997.

The pre-stretch layered body has a ΔYI of preferably 5 or less, and more preferably 3 or less. When this ΔYI falls within the range, the pre-stretch layered body is not colored and has good visibility. The lower limit thereof is ideally zero. The ΔYI is measured in accordance with ASTM E313 using "spectrocolorimeter SE2000" manufactured by NIPPON DENSHOKU INDUSTRIES CO., LTD. The same measurement is repeated 5 times and the arithmetic average thereof is calculated.

It is preferable that the outer surface of the pre-stretch layered body is flat with substantially no linear concave portion nor linear convex portion that is irregularly formed and extends in the MD direction (so-called die lines). The expression "flat with substantially no linear concave portion nor linear convex portion that is irregularly formed and extends in the MD direction" herein means that even if a linear concave portion and a linear convex portion are formed, the linear concave portion has a depth of smaller than 50 nm or a width of larger than 500 nm and the linear convex portion has a height of smaller than 50 nm or a width of larger than 500 nm. It is more preferable that the linear concave portion has a depth of smaller than 30 nm or a width of larger than 700 nm, and the linear convex portion have a height of smaller than 30 nm or a width of larger than 700 nm. Such a flat structure can prevent interference of light and generation of light leakage caused by optical refraction in the linear concave portion and the linear convex portion and improve optical performance. The expression "irregularly formed" means being formed in an unintended size, shape, etc. at an unintended position.

The depth of the linear concave portion, the height of the convex portion, and the width thereof may be determined by the following method. The pre-stretch layered body is irradiated with light, and the transmitted light is projected onto a screen. A portion corresponding to bright or dark stripes of the light on the screen (this portion is a portion where the depth of the linear concave portion and the height of the linear convex portion are large) is cut out into a 30-mm square. The surface of the cut-out film piece is observed with a three-dimensional surface structure analysis microscope (viewing area: 5 mm×7 mm), and converted into a three-dimensional image. A cross-sectional profile is determined from the three-dimensional image. The cross-sectional profile is determined at 1-mm intervals in the viewing area.

An average line is drawn on this cross-sectional profile. The length from this average line to the bottom of the linear concave portion is taken as the depth of the linear concave portion and the length from the average line to the top of the linear convex portion is taken as the height of the linear convex portion. The distance between intersections of the average line and the profile is taken as the width. The maximum values of the depth of the linear concave portion and the height of the linear convex portion are each determined from the measured values thereof, and then the widths of the linear concave portion and the linear convex portion that show these maximum values are each determined. The maximum values of the depth of the linear concave portion and the height of the linear convex portion and the widths of the linear concave portion and the linear convex portion that show these maximum values, which are determined from the aforementioned measurement, are taken as the depth of the linear concave portion, the height of the linear convex portion, and the widths thereof in the film, respectively.

The pre-stretch layered body may have a size of, e.g., 500 mm to 2,000 mm in the TD direction. The size of the pre-stretch layered body in its MD direction is not limited, and it is preferable that the phase difference plate is a long-length film.

[3. First Stretching Step]

In the first stretching step, the pre-stretch layered body is stretched in one direction at the temperature T1. That is, the pre-stretch layered body is uniaxially stretched at the temperature T1. By stretching at the temperature T1, a retardation is generated in each of the resin layer (a), the resin layer (b), and the resin layer (c) depending on the structure of the pre-stretch layered body, the stretching temperature T1, and the stretching ratio. Consequently, a retardation is generated also as the total of the resin layer (a), the resin layer (b), and the resin layer (c). In this case, e.g., when the pre-stretch layered body satisfies the requirement P, the phase of XZ polarized light relative to YZ polarized light is delayed.

The temperature T1 is set to an appropriate temperature so as to obtain the desired retardation. For example, when the glass transition temperature $Tg_A$ of the resin A and the glass transition temperature $Tg_C$ of the resin C are higher than the glass transition temperature $Tg_B$ of the resin B, it is preferable that the temperature T1 is set as follows. That is, on the basis of the glass transition temperature $Tg_A$ of the resin A, the glass transition temperature $Tg_B$ of the resin B, and the glass transition temperature $Tg_C$ of the resin C, the temperature T1 is preferably higher than $Tg_B$, more preferably higher than $Tg_B+5°$ C., and further preferably higher than $Tg_B+10°$ C., and preferably lower than a temperature of higher one of the temperatures $Tg_A$ and $Tg_C+40°$ C., and more preferably lower than a temperature of the higher one of the temperatures $Tg_A$ and $Tg_C+20°$ C. When the temperature T1 is higher than the lower limit of the aforementioned temperature range, an in-plane retardation Reb and a thickness direction retardation Rtb of the resin layer (b) can be stably set within desired ranges. When the temperature T1 is lower than the upper limit of the aforementioned temperature range, an in-plane retardation Rea and a thickness direction retardation Rta of the resin layer (a), and an in-plane retardation Rec and a thickness direction retardation Rtc of the resin layer (c) can be stably set within desired ranges.

Further, the thickness of the resin layer (c) in the pre-stretch layered body can be increased. Therefore, even when the pre-stretch layered body is stretched at a stretching ratio higher than prior-art methods, damage or thickness ununiformity of the resin layer (c) are unlikely to occur. For this reason, in the first stretching step, stretching is performed at a high stretching ratio of usually 3 times or more, preferably 3.3 times or more, and more preferably 3.5 times or more. Since stretching can be performed at such a high stretching ratio, the thickness of the phase difference plate to be obtained can be reduced. From the viewpoint of stable production of a phase difference plate, the upper limit is usually 6 times or less, preferably 5 times or less, and more preferably 4 times or less.

Uniaxial stretching may be carried out by a method known in prior art. Examples of such a method may include a method for uniaxial stretching in a longitudinal direction (usually corresponds to the MD direction) utilizing a difference in the peripheral speed between rolls; and a method for uniaxial stretching in a crosswise direction (usually corresponds to the TD direction) using a tenter. Examples of the method for uniaxial stretching in the longitudinal direction may include an IR heating procedure between rolls, and a float procedure. Among them, the float procedure is suitable since a phase difference plate having a high optical uniformity can thereby be obtained. On the other hand, examples of the method of uniaxial stretching in the crosswise direction may include a tenter procedure.

In stretching, a temperature difference along the width direction of the film in a stretching zone may be provided for reducing stretching unevenness and thickness unevenness. In order to provide the temperature difference along the width direction of the film in the stretching zone, any publicly known techniques may be used. For example, the degrees of opening of hot air nozzles are controlled in the width direction, or IR heaters are arranged in the width direction for heat controlling.

[4. Second Stretching Step]

After the first stretching step, the second stretching step is carried out. In the second stretching step, the pre-stretch layered body that has been stretched in one direction in the first stretching step is stretched in a direction approximately orthogonal to the stretching direction of the first stretching step.

In the second stretching step, the pre-stretch layered body is stretched at the temperature T2 that is lower than the temperature T1. That is, the pre-stretch layered body is uniaxially stretched at a relatively low temperature T2. By stretching at the temperature T2, a retardation is generated in each of the resin layer (a), the resin layer (b), and the resin layer (c) depending on the structure of the pre-stretch layered body, the stretching temperature T2, and the stretching ratio. Consequently, a retardation is generated also as the total of the resin layer (a), the resin layer (b), and the resin layer (c). In this case, e.g., when the pre-stretch layered body satisfies the requirement P, the phase of XZ polarized light relative to YZ polarized light is advanced by the stretching in the second stretching step.

The temperature T2 is set to an appropriate temperature so as to obtain the desired retardation. For example, when the glass transition temperature $Tg_A$ of the resin A and the glass transition temperature $Tg_C$ of the resin C are higher than the glass transition temperature $Tg_B$ of the resin B, it is preferable that the temperature T2 is set as follows. That is, on the basis of the glass transition temperature $Tg_B$ of the resin B, the temperature T2 is preferably higher than $Tg_B-20°$ C. and more preferably higher than $Tg_B-10°$ C., and preferably lower than $Tg_B+5°$ C. and more preferably lower than $Tg_B$. When the stretching temperature T2 is higher than the lower limit of the aforementioned temperature range, the pre-stretch layered body can be prevented from breaking and clouding during stretching. When the temperature T2 is lower than the upper limit of the aforementioned temperature range, the in-plane retardation Reb and the thickness direction retardation Rtb of the resin layer (b) can be stably set within desired ranges.

The difference between the temperature T1 and the temperature T2 is usually 5° C. or more, and preferably 10° C. or more. By setting such a large difference between the temperature T1 and the temperature T2, the polarizing plate compensation function can be stably expressed in the phase difference plate. The upper limit of the difference between the temperature T1 and the temperature T2 is not limited, and from the viewpoint of industrial productivity, the difference is 100° C. or less.

As the uniaxial stretching in the second stretching step, the same method as the method that may be employed in uniaxial stretching in the first stretching step may be applicable. However, it is preferable that the uniaxial stretching in the second stretching step is carried out at a smaller stretching ratio than that in the uniaxial stretching in the first stretching step. Specifically, it is preferable that the stretching ratio in the second stretching step is 1.1 times to 2 times, and more preferably 1.1 times to 1.5 times.

The combination of the stretching direction in the first stretching step and the stretching direction in the second stretching step may be, e.g., stretching in the longitudinal direction in the first stretching step followed by stretching in the crosswise direction in the second stretching step, stretching in the crosswise direction in the first stretching step followed by stretching in the longitudinal direction in the second stretching step, or stretching in a diagonal direction in the first stretching step followed by stretching in another diagonal direction orthogonal to the first diagonal direction in the second stretching step. Herein, the diagonal direction is a direction that is non-parallel with respect to the longitudinal direction and also non-parallel with respect to the crosswise direction. Particularly, it is preferable to perform stretching in the crosswise direction in the first stretching step followed by stretching in the longitudinal direction in the second stretching step. This is because, by stretching in the longitudinal direction in the second stretching step at a smaller stretching ratio, variation in the direction of the optical axis over the entire width of the obtained phase difference plate can be reduced.

When the pre-stretch layered body is subjected to the first stretching step and the second stretching step as described above, a retardation is expressed in the resin layer (a) and the resin layer (b) in each of the first stretching step and the second stretching step depending on, e.g., the stretching temperatures, stretching directions, and stretching ratios. Therefore, in the phase difference plate that is obtained by the first stretching step and the second stretching step, retardations expressed in the resin layer (a), the resin layer (b), and the resin layer (c) in each of the first stretching step and the second stretching step are combined to express a desired retardation. Accordingly, by the second stretching step, a phase difference plate having a desired retardation can be obtained.

By co-stretching the pre-stretch layered body including the resin layer (a), the resin layer (b), and the resin layer (c), the producing process can be shortened, and the producing cost can be reduced as compared with a case wherein a resin layer (a), a resin layer (b), and a resin layer (c) are separately stretched and then bonded to produce a phase difference plate. The resin layer (b) containing the resin B having a negative intrinsic birefringence alone cannot be easily stretched, and stretching unevenness and breaking may occur. However, when the resin layer (b) is protected with the resin layer (a) and the resin layer (c), the resin layer (b) can be stably co-stretched, and unevenness of the thickness of the resin layer (b) can be reduced.

[5. Other Steps]

In the method for producing a phase difference plate of the present invention, an optional step may be carried out in addition to the layered body forming step, the first stretching step, and second stretching step, as long as a desired phase difference plate can be obtained.

For example, a step of previously heating the pre-stretch layered body (a pre-heating step) may be performed before stretching the pre-stretch layered body. Examples of means for heating the pre-stretch layered body may include an oven-type heater, a radiation heater, and immersion into a liquid. Among them, the oven-type heater is preferable. The heating temperature in the pre-heating step is usually equal to or higher than a temperature of the stretching temperature −40° C., and preferably equal to or higher than a temperature of the stretching temperature −30° C., and usually equal to or lower than a temperature of the stretching temperature +20° C. and preferably equal to or lower than a temperature of the stretching temperature +15° C. The stretching temperature means the preset temperature of the heater.

For example, after one or both of the first stretching step and the second stretching step, the stretched film may be subjected to a fixing treatment. The temperature in the fixing treatment is usually equal to or higher than room temperature and preferably equal to or higher than a temperature of the stretching temperature −40° C., and usually equal to or lower than a temperature of the stretching temperature +30° C. and preferably equal to or lower than a temperature of the stretching temperature +20° C.

Further, a step of providing, e.g., a mat layer, a hard-coat layer, an anti-reflection layer, and an antifouling layer on the surface of the obtained phase difference plate may be performed.

[6. Phase Difference Plate]

A phase difference plate is obtained by the aforementioned production method. Depending on the stretching conditions of each stretching step, the aforementioned phase difference plate obtained after the first stretching step and the second stretching step may be of any one of two possible embodiments that are: (1) an embodiment in which the slow axis of the resin layer (a) after stretching, the slow axis of the resin layer (b) after stretching, and the slow axis of the resin layer (c) after stretching are approximately parallel to one another; and (2) an embodiment in which the slow axes of the resin layer (a) and the resin layer (c) after stretching are approximately orthogonal to the slow axis of the resin layer (b) after stretching. Usually, the phase difference plate is of (1) the embodiment in which the slow axis of the resin layer (a) after stretching, the slow axis of the resin layer (b) after stretching, and the slow axis of the resin layer (c) after stretching are approximately parallel to one another.

It is preferable that the phase difference plate produced by the aforementioned production method is a three-dimensional phase difference plate. Specifically, the NZ coefficient of the produced phase difference plate is preferably 0 or more, more preferably 0.3 or more, and particularly preferably 0.5 or more, and preferably 1 or less, more preferably 0.9 or less, and particularly preferably 0.8 or less. When such a three-dimensional phase difference plate is mounted on a display device, excellent optical compensation function may be expressed.

The phase difference plate may be one that shrinks in the longitudinal direction and in the crosswise direction by heat treatment at 60° C. and 90% RH for 100 hours. However, the shrinkage ratio is preferably 0.5% or less, and more preferably 0.3% or less. When the phase difference plate having such a small shrinkage ratio is used under a high-temperature and high-humidity environment, the phase difference plate can be prevented from separating from the display device due to the deformation of the phase difference plate by shrinkage stress.

The thickness of the phase difference plate as the total thickness of the resin layer (a), the resin layer (b), and the resin layer (c) is usually 10 μm or more and preferably 30 μm or more, and usually 200 μm or less and preferably 150 μm or less. In addition, the thickness variation of the resin layer (a), the resin layer (b), and the resin layer (c) on the entire surface is preferably 1 μm or less. By having such a structure, the variation in the color tone on the display device can be reduced. Further, change of the color tone after long-term use can be made uniform. In order to achieve this, in the pre-stretch layered body, the thickness variation of the resin layer (a), the resin layer (b), and the resin layer (c) on the entire surface may be 1 μm or less.

The phase difference plate is the same as the pre-stretch layered body in terms of the total light transmittance, haze, ΔYI, and JIS pencil hardness, and in that the outer surface is preferably flat with substantially no linear concave portion and linear convex portion.

The phase difference plate may have an optional layer in addition to the resin layer (a), the resin layer (b), and the resin layer (c). Examples of the optional layer may include the same layers as those described in the section of the pre-stretch layered body.

The phase difference plate may have a size of 1,000 mm to 2,000 mm in the width direction.

[7. Liquid Crystal Display Device]

The phase difference plate produced by the production method of the present invention usually has excellent polarizing plate compensation function. Therefore, the phase difference plate may be applied to a display device such as a liquid crystal display device, an organic electroluminescent display device, a plasma display device, a FED (field emission display) device, and a SED (surface field emission display) device by itself alone or in combination with another member.

The liquid crystal display device usually comprises a pair of polarizing plates (a light incident side polarizing plate and a light emitting side polarizing plate) of which absorption axes are approximately orthogonal to each other, and a liquid crystal cell interposed between the pair of polarizing plates. When the phase difference plate is provided to the liquid crystal display device, the phase difference plate may be interposed between the pair of polarizing plates. In this case, the phase difference plate may be provided on the light incident side of the liquid crystal cell, may be provided on the light emitting side of the liquid crystal cell, or may be provided on both the light incident side and the light emitting side the liquid crystal cell. The pair of polarizing plates, the phase difference plate, and the liquid crystal cell are usually integrally provided as a liquid crystal panel, and this liquid crystal panel is irradiated with light from a light source to display an image on a display surface on the light emitting side of the liquid crystal panel. In this case, the phase difference plate exerts excellent polarizing plate compensation function, and therefore light leakage of the display surface of the liquid crystal display device when the device is viewed from the oblique direction can be reduced. Further, the phase difference plate usually has excellent optical function in addition to the polarizing plate compensation function, and thus has an ability to further improve the visibility of the liquid crystal display device.

Examples of a driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode. Among them, the in-plane switching mode and the vertical alignment mode are preferable, and the in-plane switching mode is particularly preferable. A liquid crystal cell of the in-plane switching mode has a wide viewing angle. However, by applying the phase difference plate, the viewing angle can be further increased.

The phase difference plate may be bonded to the liquid crystal cell or the polarizing plate. A known adhesive may be used for bonding.

One sheet of the phase difference plate may be used alone, or two or more sheets thereof may be used.

Further, when the phase difference plate is provided to the liquid crystal display device, the phase difference plate produced by the production method of the present invention may be used in combination with another phase difference plate. For example, when the phase difference plate produced by the production method of the present invention is provided to a liquid crystal display device including a liquid crystal cell of a vertical alignment mode, the phase difference plate produced by the production method of present invention and another phase difference plate for improving viewing angle characteristics may be interposed between the pair of polarizing plates.

[8. Other Matters]

The phase difference plate produced by the production method of the present invention may also be used for an application other than those described above. For example, the phase difference plate may be formed as a ¼ wave plate by setting the in-plane retardation Re of the phase difference plate to 120 nm to 160 nm. This ¼ wave plate may be combined with a linear polarizer to form a circularly polarizing plate. In this case, the angle formed by the slow axis of the ¼ wave plate and the absorption axis of the linear polarizer is preferably 45±2°.

The phase difference plate may also be used as a protective film of the polarizing plate. The polarizing plate usually has a polarizer and protective films bonded to both surfaces thereof. When the phase difference plate is bonded to the polarizer, the phase difference plate may be used as the protective film. In this case, the liquid crystal display device can be made thin since the protective film is omitted.

EXAMPLES

The present invention will be specifically described hereinbelow with reference to Examples. However, the present invention is not limited to the following Examples. The present invention may be implemented with any modifications without departing from the scope of the claims of the present invention and equivalents thereof.

Unless otherwise stated, "%" and "part" that represent an amount in the following description are based on weight. Unless otherwise stated, the operations described in the following are performed under conditions of normal temperature and normal pressure.

[Evaluation Method]
[Thickness Measurement with Microscope]

A film was embedded in an epoxy resin and then sliced with a microtome ("RUB-2100" manufactured by Yamato Kogyo Co., Ltd.), and the cross section was observed with a scanning electron microscope. The thicknesses of a resin layer A, a resin layer B, a resin layer C, and the entire film were measured.

[Measurement of Retardation]

The in-plane retardation Re, the retardation Rth in a thickness direction, and the NZ coefficient of a phase difference film were measured with an automatic birefringence meter ("KOBRA-21ADH" manufactured by Oji Scientific Instruments) at a measurement wavelength of 590 nm.

Example 1

[Production of Pre-Stretch Film]

A film molding apparatus for three-type three-layer co-extrusion molding (apparatus of a type of forming a film consisting of three layers from three types of resins) was prepared.

Pellets of a polycarbonate resin ("WONDERLITE PC-115" available from Asahi Kasei Corporation, glass transition temperature: 145° C.) were fed to a first single-screw extruder equipped with a double-flight type screw, and then melted. The polycarbonate resin corresponds to the resin A having a positive intrinsic birefringence.

Pellets of a styrene-maleic anhydride copolymer resin ("Dylark D332" available from NOVA Chemicals Corporation, content of maleic anhydride unit: 17% by weight, glass transition temperature: 129° C.) were fed to a second single-screw extruder equipped with a double-flight type screw, and then melted. The styrene-maleic anhydride copolymer resin corresponds to the resin B having a negative intrinsic birefringence.

100 Parts of pellets of a polycarbonate resin ("WONDERLITE PC-115" available from Asahi Kasei Corporation, glass transition temperature: 145° C.) and 5 parts of cross-linked polystyrene particles with a volume average particle diameter of 0.8 μm ("Techpolymer XX-11AJ" available from SEKISUI PLASTICS CO., Ltd.) were kneaded at a temperature of 270° C. to obtain resin pellets. The resin pellets were fed to a third single-screw extruder and melted. The resin corresponds to the resin C having a positive intrinsic birefringence.

The melted resin A at 260° C. was passed through a pleat-shaped polymer filter having an opening of 5 μm, and supplied to a first manifold of a multi-manifold die (surface roughness on the die lip: Ra=0.1 μm). The melted resin B at 260° C. was passed through a leaf disc-shaped polymer filter having an opening of 5 μm, and supplied to a second manifold. Further, the melted resin C at 260° C. was passed through a pleat-shaped polymer filter having an opening of 5 μm, and supplied to a third manifold.

The resin A, the resin B, and the resin C were simultaneously extruded from the multi-manifold die at 260° C. into a three-layer film shape consisting of a resin layer (a) containing the resin A, a resin layer (b) that contained the resin B and was provided on one surface of the resin layer (a), and a resin layer (c) that contained the resin C and was provided on another surface opposite to the resin layer (a) of the resin layer (b). The melted resin thus co-extruded into a film shape was cast on a cooling roll having a surface temperature adjusted to 115° C., and then passed between two cooling rolls having a surface temperature adjusted to 120° C. to obtain a pre-stretch film having a three-layer structure including the resin layer (a), the resin layer (b), and the resin layer (c) in this order as a pre-stretch layered body (co-extrusion step). The width of the obtained pre-stretch film was 600 mm.

The thickness of the obtained pre-stretch film was measured. The thickness of the layer (a) was 22.4 μm, the thickness of the layer (b) was 211.1 μm, the thickness of the layer (c) was 9.8 μm, and the thickness of the entire film was 243.4 μm. The results are shown in Table 1.

[Evaluation of Phase of Pre-Stretch Film]

This pre-stretch film was uniaxially stretched using a tenter stretching apparatus at a stretching temperature of 152° C. and a stretching ratio of 3.5 times. The retardation Re of the stretched film was measured. The retardation measured was of linearly polarized light that was incident perpendicularly on a film plane and had a plane of vibration of its electric vector lying in an XZ plane relative to linearly polarized light that was incident perpendicularly on the film plane and had a plane of vibration of its electric vector lying in a YZ plane, wherein X axis is the uniaxial stretching direction, Y axis is a direction orthogonal to the uniaxial stretching direction in the film plane, and Z axis is a thickness direction of the film. It was found that that the retardation Re was 114 nm and the phase was delayed.

The retardation Re measurement of the pre-stretch film was further performed in the same manner as the aforementioned procedure except that the stretching temperature was changed to 130° C., wherein the retardation measured was of linearly polarized light that was incident perpendicularly on the film plane after stretched and had a plane of vibration of its electric vector lying in the XZ plane relative to linearly polarized light that was incident perpendicularly on the film plane and had a plane of vibration of its electric vector lying in the YZ plane. It was found that the retardation Re was −480 nm and the phase was advanced.

[Stretching of Pre-Stretch Film]

The pre-stretch film was supplied to a tenter crosswise uniaxial stretching apparatus and stretched in a crosswise direction at a stretching temperature of 152° C. and a stretching ratio of 3.50 times (first stretching step). Subsequently, the stretched film was supplied to a longitudinal uniaxial stretching apparatus utilizing a difference of peripheral speed between the rolls for uniaxial stretching, and then stretched in a longitudinal direction at a stretching temperature of 128° C. and a stretching ratio of 1.26 times, to obtain a phase difference film having a three-layer structure including the resin layer A, the resin layer B, and the resin layer C in this order (second stretching step). In the obtained phase difference film, the slow axis of the resin layer A, the slow axis of the resin layer B, and the slow axis of the resin layer C were approximately parallel to one another.

The thickness and retardation of the obtained phase difference film were measured. The thickness of the layer A was 5.7 μm, the thickness of the layer B was 53.7 μm, the thickness of the layer C was 2.5 and the thickness of the entire film was 61.9 μm. The in-plane retardation Re was 162 nm and the NZ coefficient was 0.69. The results are shown in Table 1.

Example 2

[Production of Pre-Stretch Film]

The same method as in Example 1 was carried out, with the melt extrusion rate of each layer was adjusted, to produce a pre-stretch film in which the thickness of a layer (a) was 19.8 μm, the thickness of a layer (b) was 200.2 μm, the thickness of a layer (c) was 8.7 μm, and the thickness of the entire film was 228.6 μm. The results are shown in Table 1.

[Evaluation of Phase of Pre-Stretch Film]

The pre-stretch film was uniaxially stretched in the same manner as in Example 1, and the retardation Re of linearly polarized light that was incident perpendicularly on a film plane and had a plane of vibration of its electric vector lying in an XZ plane relative to linearly polarized light that was incident perpendicularly on the film plane and had a plane of vibration of its electric vector lying in a YZ plane was measured. After uniaxial stretching at a stretching temperature of 151° C. and a stretching ratio of 3.3 times, the retardation Re was 120 nm. It was found that the phase was delayed. After uniaxial stretching at a stretching temperature of 130° C. and a stretching ratio of 3.3 times, the retardation Re was −460 nm. It was found that the phase was advanced.

[Stretching of Pre-Stretch Film]

The pre-stretch film was supplied to a tenter crosswise uniaxial stretching apparatus and stretched in a crosswise direction at a stretching temperature of 151° C. and a stretching ratio of 3.30 times (first stretching step). Subsequently, the stretched film was supplied to a longitudinal uniaxial stretching apparatus utilizing a difference of peripheral speed between the rolls for uniaxial stretching, and then stretched in a longitudinal direction at a stretching temperature of 124° C. and a stretching ratio of 1.24 times, to obtain a phase difference film having a three-layer structure including the resin layer A, the resin layer B, and the resin layer C in this order (second stretching step). In the obtained phase difference film, the slow axis of the resin layer A, the slow axis of the resin layer B, and the slow axis of the resin layer C were approximately parallel to one another.

The thickness and retardation of the obtained phase difference film were measured. The thickness of the layer A was 5.4 μm, the thickness of the layer B was 54.6 μm, the thickness of the layer C was 2.4 μl, and the thickness of the entire film was 62.4 µm. The in-plane retardation Re was 162 nm and the NZ coefficient was 0.69. The results are shown in Table 1.

Example 3

[Production of Pre-Stretch Film]

The same method as in Example 1 was carried out, with the melt extrusion rate of each layer was adjusted, to produce a pre-stretch film of which the thickness of a layer (a) was 18.0 µm, the thickness of a layer (b) was 181.9 µm, the thickness of a layer (c) was 7.9 µm, and the thickness of the entire film was 207.8 µm. The results are shown in Table 1.

[Evaluation of Phase of Pre-Stretch Film]

The pre-stretch film was uniaxially stretched in the same manner as in Example 1, and the retardation Re of linearly polarized light that was incident perpendicularly on a film plane and had a plane of vibration of its electric vector lying in an XZ plane relative to linearly polarized light that was incident perpendicularly on the film plane and had a plane of vibration of its electric vector lying in a YZ plane was measured. After uniaxial stretching at a stretching temperature of 152° C. and a stretching ratio of 3.00 times, the retardation Re was 112 nm. It was found that the phase was delayed. After uniaxial stretching at a stretching temperature of 130° C. and a stretching ratio of 3.00 times, the retardation Re was −420 nm. It was found that the phase was advanced.

[Stretching of Pre-Stretch Film]

The pre-stretch film was supplied to a tenter crosswise uniaxial stretching apparatus and stretched in a crosswise direction at a stretching temperature of 152° C. and a stretching ratio of 3.00 times (first stretching step). Subsequently, the stretched film was supplied to a longitudinal uniaxial stretching apparatus utilizing a difference of peripheral speed between the rolls for uniaxial stretching, and then stretched in a longitudinal direction at a stretching temperature of 124° C. and a stretching ratio of 1.23 times, to obtain a phase difference film having a three-layer structure including the resin layer A, the resin layer B, and the resin layer C in this order (second stretching step). In the obtained phase difference film, the slow axis of the resin layer A, the slow axis of the resin layer B, and the slow axis of the resin layer C were approximately parallel to one another.

The thickness and retardation of the obtained phase difference film were measured. The thickness of the layer A was 5.4 µm, the thickness of the layer B was 54.6 µm, the thickness of the layer C was 2.4 µm, and the thickness of the entire film was 62.4 µm. The in-plane retardation Re was 162 nm and the NZ coefficient was 0.69. The results are shown in Table 1.

Comparative Example 1

[Production of Pre-Stretch Film]

The same method as in Example 1 was carried out except that cross-linked polystyrene particles were not added, with the melt extrusion rate of each layer was adjusted, to produce a pre-stretch film. The thickness of the obtained pre-stretch film was measured. The thickness of the layer (a) was 18 µm, the thickness of the layer (b) was 182 µm, the thickness of the layer (c) was 6 µm, and the thickness of the entire film was 206 µm. The results are shown in Table 1.

[Evaluation of Phase of Pre-Stretch Film]

The pre-stretch film was uniaxially stretched in the same manner as in Example 1, and the retardation Re of linearly polarized light that was incident perpendicularly on a film plane and had a plane of vibration of its electric vector lying in a XZ plane relative to linearly polarized light that was incident perpendicularly on the film plane and had a plane of vibration of its electric vector lying in a YZ plane was measured. After uniaxial stretching at a stretching temperature of 152° C. and a stretching ratio of 2.7 times, the retardation Re was 110 nm. It was found that the phase was delayed. After uniaxial stretching at a stretching temperature of 130° C. and a stretching ratio of 2.7 times, the retardation Re was −410 nm. It was found that the phase was advanced.

[Stretching of Pre-Stretch Film]

The pre-stretch film was supplied to a tenter crosswise uniaxial stretching apparatus and stretched in a crosswise direction at a stretching temperature of 152° C. and a stretching ratio of 2.70 times (first stretching step). Subsequently, the stretched film was supplied to a longitudinal uniaxial stretching apparatus utilizing a difference of peripheral speed between the rolls for uniaxial stretching, and then stretched in a longitudinal direction at a stretching temperature of 123° C. and a stretching ratio of 1.19 times, to obtain a phase difference film having a three-layer structure including the resin layer A, the resin layer B, and the resin layer C in this order (second stretching step). In the obtained phase difference film, the slow axis of the resin layer A, the slow axis of the resin layer B, and the slow axis of the resin layer C were approximately parallel to one another.

The thickness and retardation of the obtained phase difference film were measured. The thickness of the layer A was 6.1 µm, the thickness of the layer B was 61.8 µm, the thickness of the layer C was 2.0 µm, and the thickness of the entire film was 69.9 µm. The in-plane retardation Re was 163 nm and the NZ coefficient was 0.69. The results are shown in Table 1.

Comparative Example 2

[Production of Pre-Stretch Film]

The same method as in Comparative Example 1 was carried out, with the melt extrusion rate of each layer was adjusted, to produce a pre-stretch film of which the thickness of a layer (a) was 22.4 µm, the thickness of a layer (b) was 211.0 µm, the thickness of a layer (c) was 7.8 µm, and the thickness of the entire film was 241.3 µm. The results are shown in Table 1.

[Evaluation of Phase of Pre-Stretch Film]

The pre-stretch film was uniaxially stretched in the same manner as in Example 1, and the retardation Re of linearly polarized light that was incident perpendicularly on a film plane and had a plane of vibration of its electric vector lying in a XZ plane relative to linearly polarized light that was incident perpendicularly on the film plane and had a plane of vibration of its electric vector lying in a YZ plane was measured. After uniaxial stretching at a stretching temperature of 152° C. and a stretching ratio of 3.5 times, the retardation Re was 114 nm. It was found that the phase was delayed. After uniaxial stretching at a stretching temperature of 130° C. and a stretching ratio of 3.5 times, the retardation Re was −480 nm. It was found that the phase was advanced.

[Stretching of Pre-Stretch Film]

The pre-stretch film was supplied to a tenter crosswise uniaxial stretching apparatus and stretched in a crosswise direction at a stretching temperature of 152° C. and a stretching ratio of 3.50 times (first stretching step). Subsequently, the stretched film was supplied to a longitudinal uniaxial stretching apparatus utilizing a difference of peripheral speed between the rolls for uniaxial stretching, and then stretched in a longitudinal direction at a stretching temperature of 128° C. and a stretching ratio of 1.26 times, attempting to produce a phase difference film having a three-layer structure including the resin layer A, the resin layer B, and the resin layer C in this order. However, wrinkles were formed on the film surface, and consecutive production of a uniform film (second stretching step) could not be performed.

The obtained film had a part where wrinkles were not formed, and the part was used as a phase difference film. In this phase difference film, the slow axis of the resin layer A, the slow axis of the resin layer B, and the slow axis of the resin layer C were approximately parallel to one another. The thickness of the layer A was 5.7 μm, the thickness of the layer B was 53.7 mm, the thickness of the layer C was 2.0 μm, and the thickness of the entire film was 61.4 μm. The in-plane retardation Re was 161 nm and the NZ coefficient was 0.69. The results are shown in

TABLE 1

[Table 1. Results of Examples and Comparative Examples]

|  |  | Example 1 | Example 2 | Example 3 | Comparative Example 1 | Comparative Example 2 |
|---|---|---|---|---|---|---|
| Pre-stretch film | Thickness of layer (a) (μm) | 22.4 | 19.8 | 18.0 | 18.0 | 22.4 |
|  | Thickness of layer (b) (μm) | 211.1 | 200.2 | 181.9 | 182.0 | 211.0 |
|  | Thickness of layer (c) (μm) | 9.8 | 8.7 | 7.9 | 6.0 | 7.8 |
|  | Total thickness (μm) | 243.4 | 228.6 | 207.8 | 206.0 | 241.3 |
| First stretching step | Stretching temperature (° C.) | 152 | 151 | 152 | 152 | 152 |
|  | Stretching ratio (times) | 3.50 | 3.30 | 3.00 | 2.70 | 3.50 |
| Second stretching step | Stretching temperature (° C.) | 128 | 124 | 124 | 123 | 128 |
|  | Stretching ratio (times) | 1.26 | 1.24 | 1.23 | 1.19 | 1.26 |
| Phase difference film | Thickness of layer A (μm) | 5.7 | 5.4 | 5.4 | 6.1 | 5.7 |
|  | Thickness of layer B (μm) | 53.7 | 54.6 | 54.6 | 61.8 | 53.7 |
|  | Thickness of layer C (μm) | 2.5 | 2.4 | 2.4 | 2.0 | 2.0 |
|  | Total thickness (μm) | 61.9 | 62.4 | 62.4 | 69.9 | 61.4 |
|  | Re (nm) | 162 | 162 | 162 | 163 | 161 |
|  | Rth (nm) | 30 | 30 | 30 | 31 | 30 |
|  | NZ coefficient | 0.69 | 0.69 | 0.69 | 0.69 | 0.69 |

DISCUSSION

In Examples 1 to 3, the thickness of the phase difference film can be made thinner as compared with Comparative Example 1 in which addition of cross-linked polystyrene particles was not performed. Further, when the thickness is forcibly reduced in Comparative Example 2 in which cross-linked polystyrene particles are not added, a phase difference film cannot be stably produced. As confirmed from these matters, the production method of the present invention realizes stable production of a thin phase difference film.

The invention claimed is:

1. A method for producing a phase difference plate, comprising:
    a step of forming a layered body including a resin layer (a) containing a resin A having a positive intrinsic birefringence, a resin layer (b) that contains a resin B having a negative intrinsic birefringence and is provided on a surface of the resin layer (a), and a resin layer (c) that contains a resin C having a positive intrinsic birefringence and is provided on another surface opposite to the resin layer (a) of the resin layer (b);
    a first stretching step of stretching the layered body in one direction at a temperature T1 and a stretching ratio of 3 times or more; and
    a second stretching step of, after the first stretching step, stretching the layered body in another direction that is approximately orthogonal to the stretching direction at a temperature T2 that is lower than the temperature T1 to obtain a phase difference plate,
    wherein the resin C contains a polymer X having a positive intrinsic birefringence and cross-linked particles of a polymer Y having a negative intrinsic birefringence.

2. The production method according to claim 1, wherein the resin layer (c) has a thickness thinner than a thickness of the resin layer (a).

3. The production method according to claim 1, wherein the phase difference plate has an NZ coefficient of 0 or more and 1 or less.

4. The production method according to claim 1, wherein the polymer Y is a polystyrene-based polymer.

5. The production method according to claim 1, wherein the resin A has a glass transition temperature $Tg_A$ that is higher than a glass transition temperature $Tg_B$ of the resin B.

6. The production method according to claim 1, wherein the layered body is formed by a co-extrusion method.

7. The production method according to claim 1, wherein
    a phase of linearly polarized light that is incident perpendicularly on a film plane and has a plane of vibration of its electric vector lying in an XZ plane relative to linearly polarized light that is incident perpendicularly on the film plane and has a plane of vibration of its electric vector lying in a YZ plane is
    delayed when the layered body is uniaxially stretched at a temperature T1 in an X-axial direction, and
    advanced when the layered body is uniaxially stretched at a temperature T2 different from the temperature T1 in the X-axial direction, wherein, in the layered body, X axis is a uniaxial stretching direction, Y axis is a direction orthogonal to the uniaxial stretching direction in the film plane, and Z axis is a film thickness direction.

8. The production method according to claim 1, wherein the amount of the cross-linked particles of the polymer Y is 0.01 parts by weight or more, and 30 parts by weight or less, with respect to 100 parts by weight of the polymer X.

9. The production method according to claim 1, wherein the average particle diameter of the polymer Y is 0.1 μm or more and 1.5 μm or less.

10. The production method according to claim 1, wherein the amount of the cross-linked particles of the polymer Y is 0.3 parts by weight or more, and 10 parts by weight or less, with respect to 100 parts by weight of the polymer X.

11. The production method according to claim 1, wherein the average particle diameter of the polymer Y is 0.3 μm or more and 0.9 μm or less.

12. The production method according to claim 1, wherein the phase difference plate has an NZ coefficient of 0.3 or more and 0.9 or less.

13. The production method according to claim 1, wherein the phase difference plate has an NZ coefficient of 0.5 or more and 0.8 or less.

\* \* \* \* \*